US008102549B2

(12) United States Patent
Morales et al.

(10) Patent No.: US 8,102,549 B2
(45) Date of Patent: Jan. 24, 2012

(54) SYSTEM AND METHOD FOR IMPROVED PRINT JOB SCHEDULING

(75) Inventors: Javier A. Morales, Rochester, NY (US); Michael E. Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1120 days.

(21) Appl. No.: 11/589,547

(22) Filed: Oct. 30, 2006

(65) Prior Publication Data

US 2008/0144081 A1 Jun. 19, 2008

(51) Int. Cl.
*G06F 3/12* (2006.01)

(52) U.S. Cl. .................... 358/1.15; 358/1.13; 358/1.14; 358/1.1

(58) Field of Classification Search ................. 358/1.15, 358/1.14, 1.1
See application file for complete search history.

(56) References Cited

U.S. PATENT DOCUMENTS 4,121,818 A 10/1978 Riley et al.
5,287,194 A * 2/1994 Lobiondo .................... 358/296
5,579,447 A * 11/1996 Salgado ........................ 358/1.9
5,615,015 A 3/1997 Krist et al.
5,760,775 A 6/1998 Sklut et al.
5,995,721 A 11/1999 Rourke et al.
6,618,167 B1 * 9/2003 Shah ........................... 358/1.15
6,659,662 B2 * 12/2003 Grohs ............................ 400/76
6,738,155 B1 5/2004 Rosenlund et al.
6,952,801 B2 10/2005 Warmus et al.
6,970,261 B1 * 11/2005 Robles ......................... 358/1.15
7,051,328 B2 5/2006 Rai et al.
7,061,636 B2 6/2006 Ryan et al.
7,079,266 B1 7/2006 Rai et al.
2001/0043357 A1 * 11/2001 Owa et al. .................... 358/1.15
2002/0126307 A1 * 9/2002 Ohwa .......................... 358/1.14
2002/0129081 A1 * 9/2002 Rai et al. ....................... 709/102

* cited by examiner

*Primary Examiner* — King Poon
*Assistant Examiner* — Jacky X Zheng

(57) ABSTRACT

There is provided a system for scheduling two or more print job suites for shipment to two or more different physical destinations. The system includes a print job processing estimator for estimating a time required to process a first one of the two or more print job suites. The system further includes a print job production manager which uses the time estimated by the print job processing estimator to cause the first one of the two or more print job suites to be processed for shipment before a second one of the print job suites is processed for shipment.

4 Claims, 5 Drawing Sheets

SYSTEM AND METHOD FOR IMPROVED PRINT JOB SCHEDULING

BACKGROUND

The disclosed embodiments relate to an improved print job scheduling approach for a print shop and, more particularly, to a system and method using "pull model" production principles to improve the print shop's ability to fulfill multiple print job orders for shipment to multiple physical destinations Many printing systems in use today utilize printing plates or cylinders, which are engraved or photochemically processed to create an image thereon. In one example, ink, or comparable marking material, is then deposited on a plate or cylinder and the ink is thereafter transferred to a substrate, such as paper. In a conventional printing press, a number of pages are printed on a sheet of paper to form a signature, which is then folded and assembled with other signatures. The assembled signatures are then bound, trimmed and finished by finishing apparatus to produce finished books, such as magazines, catalogs or any other printed and bound matter.

Often, there is a need to produce different versions of books and/or customized books within a single press run. For example, it may be desirable to produce a number of standard books together with a number of books having additional and/or different signatures or pages therein. Also, it may be necessary or desirable to provide customized information in the form of an address label, personalized information or the like on the inside or outside of finished books. In either case, conventional printing systems are not easily adaptable to produce books of these types.

A printing system which has the ability to produce differing book versions and/or books with customized information is disclosed in U.S. Pat. No. 4,121,818 to Riley. The printing system includes a number of packer boxes disposed adjacent a binding chain wherein each packer box stores a plurality of signatures. A control is included for controlling the packer boxes to selectively feed signatures onto chain spaces of the binding chain so that books of varying content can be produced. Customized information can be printed on the signatures by means of an ink jet printer which is selectively operated by the control. Other types of customization can be effectuated, such as by inserting or onserting cards or the like.

Print fulfillment shops, such as book printers, increasingly print to fulfill orders, as opposed to printing to stock inventory. Typical orders may necessitate the production of many different documents that are then shipped in different quantities to multiple destinations. A publisher might order several book titles for distribution to its retail outlets, and have a quantity of each book type sent to a specific store—each quantity would depend on the number of copies remaining at a given one of the specific stores. Print production in this scenario can create problems in shipping and fulfillment departments if there are a large variety of books that need to be shipped as a unit to many different stores. If all required copies of a particular document (e.g., book) are produced in one print run and then distributed, at a shipping and fulfillment department, among multiple shipping containers, then the shipping and fulfillment department can quickly become cluttered with partially filled containers. This can be particularly problematic for a just-in-time fulfillment situation where the object is to ship a suite of documents with many different book titles but just a relatively few copies for each title. It would be desirable to provide an approach for improving document production management in the above-mentioned just-in-time fulfillment situation.

SUMMARY OF DISCLOSED EMBODIMENTS

In accordance with one aspect of the disclosed embodiments there is provided a system for scheduling two or more print job suites for shipment to two or more different physical destinations. The two or more print job suites include a first print job suite with one or more print job documents and a second print job suite with one or more print job documents. The first print job suite is intended for shipment to a first one of the two or more different physical destinations, and the second print job suite is intended for shipment to a second one of the two or more different physical destinations. The scheduling system includes: a print job processing estimator for estimating a time required to process the one or more print job documents of the first print job suite; and a production manager communicating with the print job processing estimator. In practice, the production manager uses the time estimated by the print job processing estimator for causing processing of the one or more print job documents of the first print job suite to occur prior to processing of the one or more print job documents of the second print job suite, wherein the processed first print job suite is ready for shipment to the first one of the two or more different physical destinations before the processed second print job suite is ready for shipment to the second one of the two or more different physical destinations.

In accordance with another aspect of the disclosed embodiments there is provided a system for scheduling two or more print job suites for shipment to two or more different physical destinations. The two or more print job suites include a first print job suite with one or more print job documents and a second print job suite with one or more print job documents. The first print job suite is intended for shipment to a first one of the two or more different physical destinations, and the second print job suite is intended for shipment to a second one of the two or more different physical destinations. The scheduling system includes: (A) a print job estimator for estimating (1) a time required to process the one or more print job documents of the first print job suite; and (2) a time required to process the one or more print job documents of the second print job suite; (B) a production manager; (C) wherein, when a first selected condition is met, the production manager uses the time estimated in (A)(1) for causing processing of the one or more print job documents of the first print job suite to occur prior to processing of the one or more print job documents of the second print job suite, the processed first print job suite being ready for shipment to the first one of the two or more different physical destinations before the processed second print job suite is ready for shipment to the second one of the two or more different physical destinations; and wherein, when a second selected condition is met, the production manager uses the time estimated in (A)(2) for causing processing of the one or more print job documents of the second print job suite to occur prior to processing of the one or more print job documents of the first print job suite, the processed second print job suite being ready for shipment to the second one of the two or more different physical destinations before the processed first print job suite is ready for shipment to the first one of the two or more different physical destinations.

BRIEF DESCRIPTION OF THE DRAWINGS

By way of example, disclosed embodiments are described with reference to the accompanying drawings, in which.

DESCRIPTION OF DISCLOSED EMBODIMENTS

Figure 1:
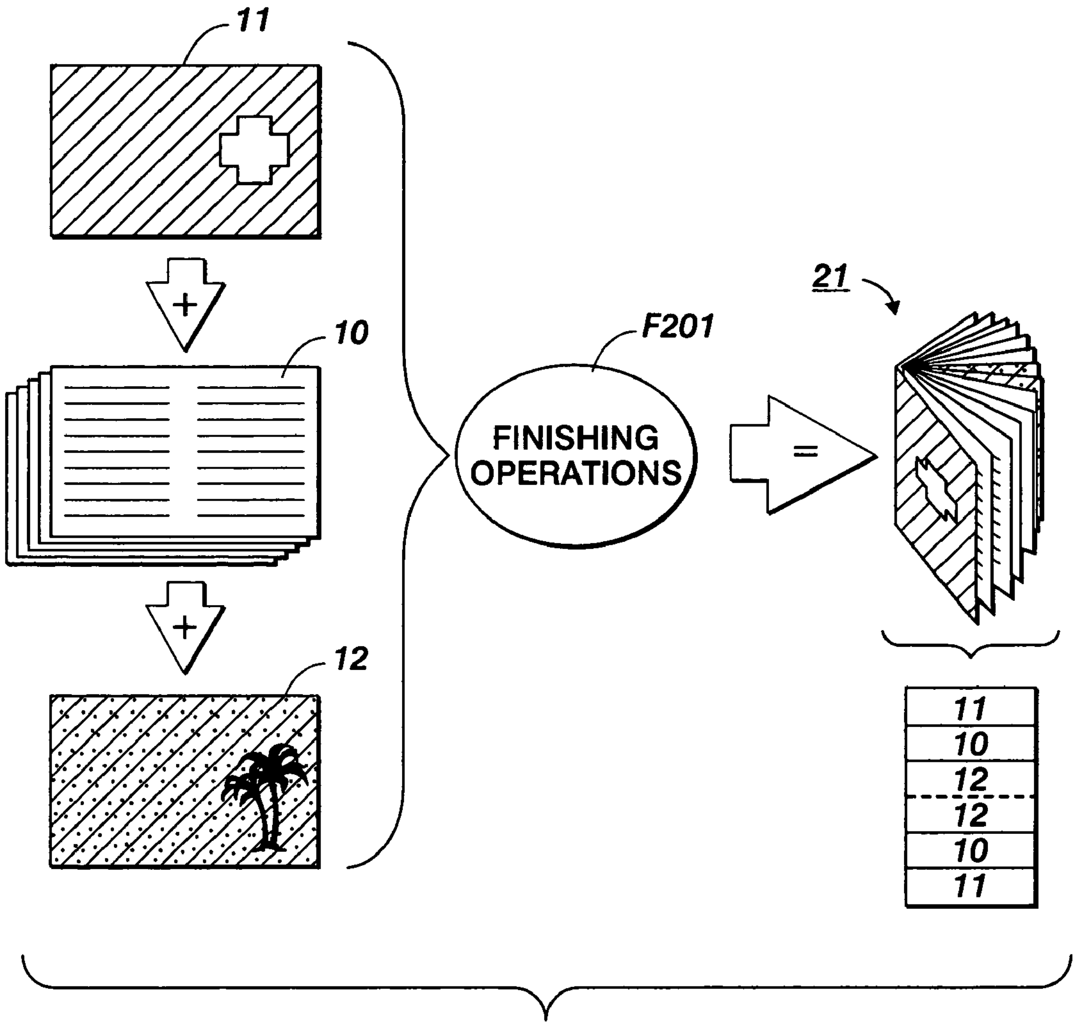
FIG. 1 shows finishing operations being applied to different portions of a print job to form a finished document.

The disclosed embodiments relate, at least in part, to the electronic management and control of a wide range of finishing processes characterized by input from multiple production operations and equipment that, depending upon the job, may be variably applied to work pieces that themselves are highly variable between different jobs. Although the disclosed embodiments are discussed in relation to printing and finishing operations for printed documents, the disclosed embodiments might apply to such industries, without limitation, as packaging operations for various consumer and industrial products, printed wiring board production, greeting card development, etc. In particular, the disclosed embodiments comprehend access to many operations where processes for production of work pieces are managed separately from processes for finishing and packaging of such work pieces.

Creation and production of printed documents often involves many production and finishing operations that are highly variable with each job. In general, the various operations can be grouped into three major phases: 1) creation of the document information, including prepress operations that render the document in a form suitable for printing, 2) printing of the information onto some form of media such as paper, and 3) finishing of the selected media into a completed document. These 3 major phases often have many sub-phases, and the entire process may vary from relatively simple to extremely complex. The disclosed embodiments relate, in part, with techniques by which a user may provide detailed instructions for each of the three phases such that instructions may be created as early as during the first phase that are sufficient to guide the entire process through to completion of the third phase. Although of potential use in many printing operations, the disclosed embodiments are particularly applicable to automated systems for creating, printing, and finishing complex documents within a multi-printer, completely digital environment using digital printers.

Traditionally in phase 1, when a document is composed, the person doing the composition will create one or more electronic image files that represent the parts of the document to be produced. These electronic image data files might be stored in many different formats by many different document creation and manipulation programs. For instance, for a complex document such as a book that utilizes color printing for book covers and pictorial inserts, any of a variety of Page Description Languages (PDLs), such as Postscript® and Postscript-compatible languages, might be used to render the color images in printable form. Often different components within a document will utilize different PDLs. For instance, the cover may be created by a different work team or upon different equipment than photographic reprints or other internal color components. Each prepress team or prepress device may utilize a PDL optimized for its use. For pages comprised of simple monochrome text, desk-top publishing programs may be utilized to render such pages or a simpler word processing language may be utilized. Still other prepress formats may be utilized for printing of inserts, dividers, and other possible components internal to the finished document. There also may be included in the assembly/finishing job non-printed components such as, without limitation, plastic separators, previously printed sheets retrieved from inventory, photographically produced sheets, or specialized media such as vinyl disk holders or perfume sample packs.

Figure 2:
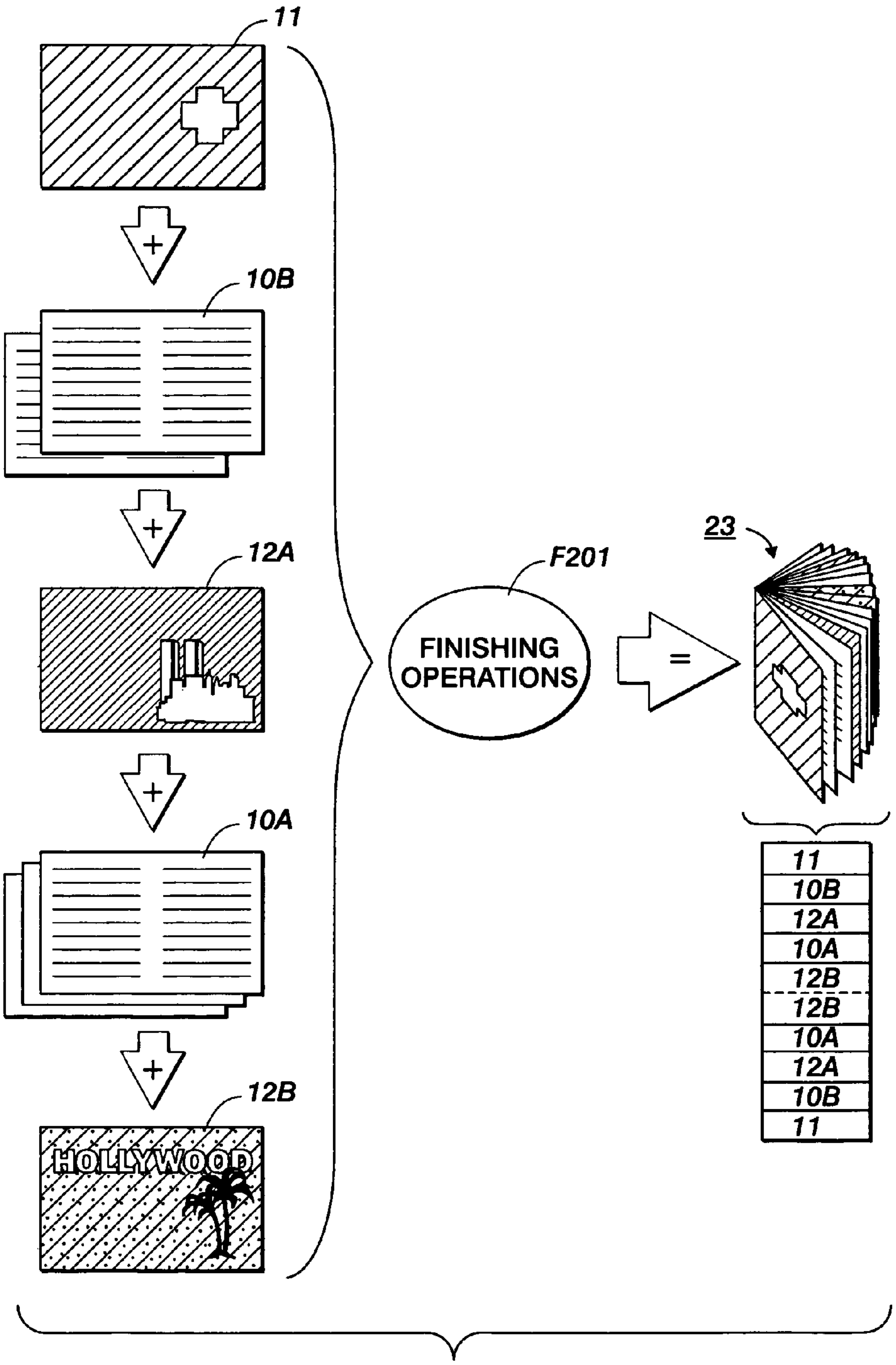
FIG. 2 shows additional print job components being added to the finished document.

Referring to FIGS. 1 and 2, examples of documents with different components and levels of complexity are shown. Beginning in FIG. 1, a simple signature document is shown that comprises an insert component 12 placed face down on a gathering tray or table, followed by body component 10 placed on top of insert 12 which is then followed by cover 11. A finishing operation indicated in block form at F201 is shown. Such finishing operation F201 may comprise simple folding of the signature body or may include center stapling or similar binding operation. When cover 11 is placed on top finishing operation 201 folds the signature, a cover-bound document 21 is created as shown. The completed document 21 is shown to the right of finishing operation F201. For explanatory purposes, the arrangement of components is shown in box form below finished document 21.

FIG. 2 shows the result of layering two body components 10*a* and 10*b* in a stack with two insert components 12*a* and 12*b* in the order indicated. Cover 11 is added last to the stack. Completed document 23 contains the 9 layers expected from such an arrangement, with the middle layer being a double layer comprising insert component 12*b*.

Obviously, documents may vary greatly in complexity depending upon the number and order of components, finishing options chosen, etc. Typically, various prepress devices create individual components of the document and digitally render these components in formats that are suitable for printing. PDLs such as Postscript®-compatible languages are often used for such purposes. Subsections of the job that require different prepress or printing operations are typically divided by an operator at an early point in the process. After completion of prepress operations for each portion of the job, the operator(s) send the various portions of the job to printers appropriate for each such portion, thereby initiating different "paths" that each portion of the job my take.

Figure 3:
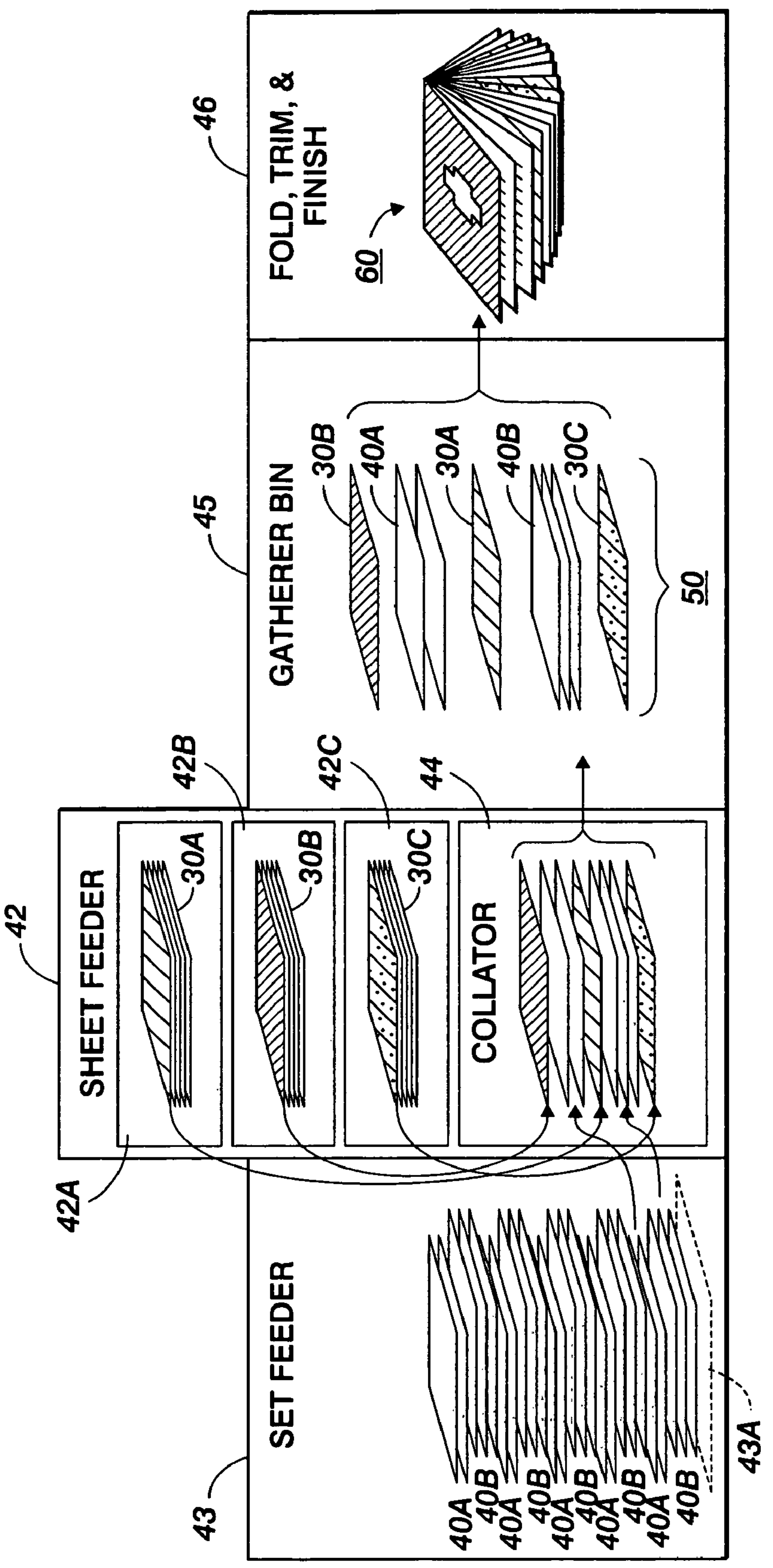
FIG. 3 shows a finishing operation being performed on a print job being collected from multiple sources.

FIG. 3 shows typical assembler/finisher operations for a moderately complex document. In the shown example, a set of color portions, 30*a*, 30*b*, and 30*c*, have been printed by a color printer and outputted from the printer in non-collated offset form. A set of monochrome portions, 40*a* and 40*b*, have also been printed and have been outputted from the printer in a stack of alternating, collated offset sets. After printing and output into their respective intermediate output bins, the various printed sheets have been gathered from their respective printer output bins, transported, and placed in the bins shown in FIG. 3 for feeding into the assembler/finisher apparatus. Color components 30*a*, 30*b*, and 30*c* are placed into sheet feeder receiving bins 42*a*, 42*b*, and 42*c* of sheet feeder 42. An example of such sheet feeder equipment integrated coupled with book making equipment is a Model MC80 sheet feeder integrated with book maker Model SPF-20, both manufactured by Horizon International, Inc. Monochrome components 40*a* and 40*b* are placed in feeder bin 43*a* of set feeder 43 in a manner that maintains the alternating, collated offset stack. An example of such set feeder equipment 43 is a DocuFeed 150 sold by Standard Duplicating Machines Corporation, Inc.

It is important to note that in many jobs, receiving feeder bins such as 42*a*, 42*b*, 42*c*, and 43*a* have stack height constraints that are less than the total stack height of a particular portion of the job that was printed. In the prior art, an operator typically manually separates a stack of printed sheets into smaller stacks that will fit within the constraints of the receiving bins.

Returning to FIG. 3, collator 44 is programmed by an operator for interleaving and collating the components in the correct order. When operated, collator 44 operates in conjunction with sheet feeder 42 and set feeder 43 such that various sheets are placed in a completed stack 50 in the correct order within gathering station or gathering bin 45. Next, stack 50 is delivered to finisher apparatus 46 where it is first folded, the folded signature stack is then bound, trimmed and otherwise finished into a completed document 60. Among the finishing operations that may be performed within finisher 46 are the following: gluing in, adhesive binding, general stitching, saddle stitching, thread sewing, side sewing, stapling, scoring, and trimming.

Much prior art deals with operations that automate tasks internal to each of equipment and processes described above. In particular, much work has been done to provide automatic linkages between prepress operations and digital printing processes, including output from printers at intermediate finishing stations with capabilities such as collating. One aspect of such prior art includes creation of virtual job tickets to electronically convey information from prepress apparatus through to intermediate finishing operations of the selected digital printers. See, e.g., U.S. Pat. No. 5,995,721 issued to Rourke et al. U.S. Pat. No. 5,615,015 issued to Krist et al.; U.S. Pat. No. 5,760,775 issued to Sklut et al. In Rourke et al., for instance, prepress processes examine the attributes of a print job in order to determine which of a variety of printing apparatus are capable of printing each particular portion of the job in accordance with the specified attributes. The instructions governing printing of each specific portion are provided to each printer pursuant to a virtual job ticket. In Rourke and in other prior art, however, digital tracking and control linkages between the paths of various job portions sent to different printers is generally lost after each portion is sent to a different printer. The virtual job ticket is used only during the printing process itself and during any post-printing processes directly linked to the printing phase of the job. Thereafter, the parsed portions of the job are re-integrated not by use of a virtual job ticket providing instructions to offline finishing but by dropping sheets of one parsed portion into "holes" left in the printing queue of a second portion. See Rourke, column 13, line 11[ndash]39. Another characteristic found in Rourke and in other prior art is that a job is parsed into portions based upon printing characteristics and not upon constraints to be encountered during the entire printing and finishing process.

Further detailed disclosure regarding finishing operations that may be appropriate for use with the presently disclosed embodiments may be found in U.S. Pat. No. 7,061,636 to Ryan et al., the pertinent portions of which are incorporated herein by reference.

Figure 4:
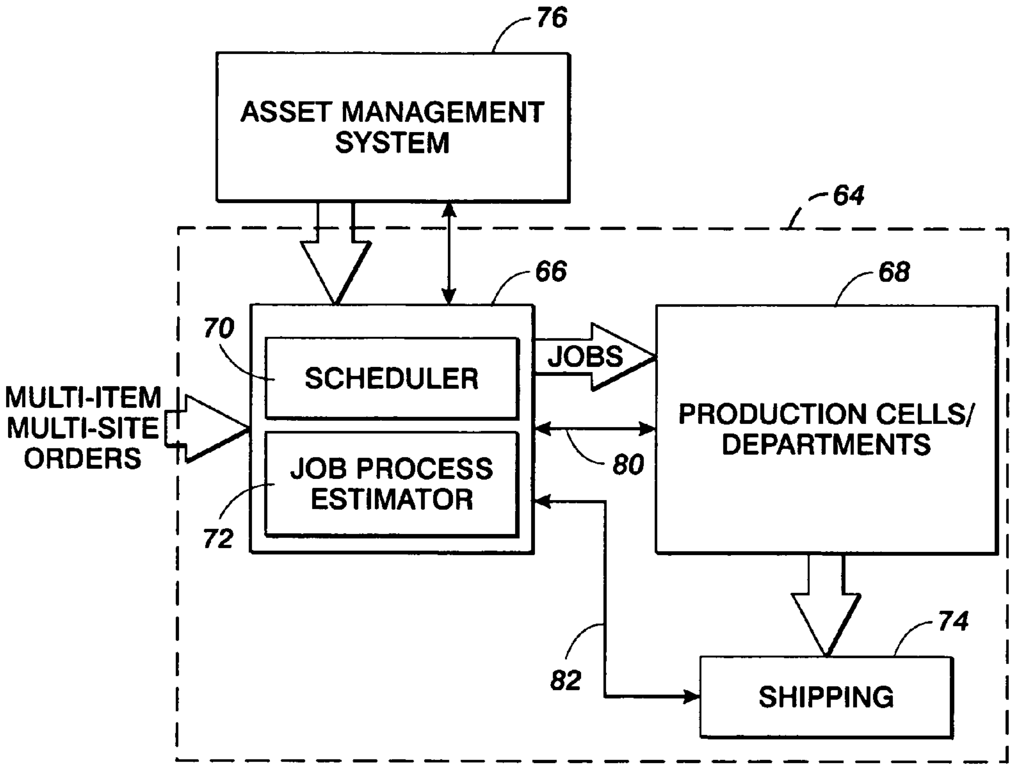
FIG. 4 is a diagrammatic drawing illustrating an exemplary arrangement for implementing certain aspects of the disclosed embodiments.

Referring now to FIG. 4, an exemplary arrangement for implementing certain aspects of the disclosed embodiments is shown. As shown, a print factory or shop, designated by the numeral 64, includes a production management system 66 communicating with a series of production cells or departments 68. An example of a print factory using a series of autonomous cells is described in U.S. Pat. No. 7,079,266 to Rai et al., and some principles of departmental printing are discussed in U.S. Pat. No. 4,121,818 to Riley et al., U.S. Pat. No. 6,738,155 to Roseniund et al., and U.S. Pat. No. 6,952,801 to Warmus et al., the pertinent portions of which patents are incorporated herein by reference.

The production management system (or simply "production manager") 66 is shown as including a scheduler 70 and processing estimator 72. In the exemplary implementation of FIG. 4, multi-item, multi-destination orders are provided to the production manager locally, or by way of a suitable network connection. In operation, the production manager causes scheduled jobs (which can be stored in and thereafter obtained from any suitable form of volatile or non-volatile memory (not shown)) to be delivered to the production cells/departments 68 for execution. The scheduling functionality of scheduler 70 can be achieved with a variety of implementations, such as the one disclosed in U.S. Pat. No. 7,051,328 to Rai et al., the pertinent portions of which are incorporated herein by reference. The estimation function of the job processing estimator 72 can be achieved with a variety of implementations, such as the one disclosed in U.S. Pat. No. 5,579,447 to Salgado, the pertinent portions of which are incorporated herein by reference. It will be appreciated by those skilled in art that subsystems in addition to the scheduler 70 and job processing estimator 72 (such as a resource manager or job parser) might be required to fulfill job orders in accordance with the process described below.

Pursuant to the disclosed process, completed job orders are delivered from the production cells/departments to a shipping area 74. Additionally, pre-stored jobs, e.g., archived jobs, may be provided to the production cells/departments via an asset management system, designated by the numeral 76.

The disclosed embodiments relate to a system that, in one example, manages the production of printed documents based on their shipping destination(s). For instance, an improved job production management system for improving efficiency in shipping and fulfillment departments is disclosed. In one aspect of the disclosed improvement, when a multi-item, multi-destination order (including multiple items that are to be distributed to multiple destinations) arrives at the shop, the production manager 66 (FIG. 4) schedules and manages their production so that finished documents are delivered to shipping and fulfillment based on their shipping destination(s).

In one contemplated approach, the production manager 66 receives an order for 3 different book types to be printed and shipped to 3 different destinations. The overall print quantities are 325 sets of Book A, 450 sets of Book B and 375 sets of Book C. The production manager parses through the order and determines that the order is to be divided as follows:

Destination A: 150 sets of Book A, 100 sets of Book B and 200 sets of Book C.

Destination B: 50 sets of Book A, 200 sets of Book B and 75 sets of Book C.

Destination C: 125 sets of Book A, 150 sets of Book B and 100 sets of Book C.

The production manager 66 also determines that Books A and C are composed of a book cover and a book block; whereas Book B is composed of a book cover, color inserts and a book block.

Referring still to FIG. 4, the production manager 66 is configured with information about available equipment in production cells/departments 68, the information including the types of jobs each engine can produce and performance information that allows the system to estimate (using job processing estimator 72) how long a given job is likely to take to complete. Job production or completion times might be optionally supplemented with actual data from devices in the shop floor. This would provide the production manager with information about different job part types and job dependencies. More particularly, in one part of the above example, the system would understand that color inserts and book covers are scheduled to be printed before mono book blocks.

The production manager 66 also understands that the covers and inserts should be sent to a color print engine, and the book blocks should be sent to a monochrome engine. Furthermore, the covers and inserts should be ready before production of the book blocks is completed. Using available information the production manager schedules specific print runs of job components so they are available when they are needed to produce the overall job. Scheduling would vary, depending on whether inserts are inserted manually or via page exception programming. Scheduling would also be affected by whether the binding of all job parts happens inline (where covers are preferably produced first) or offline (where covers and blocks are preferably produced concurrently). Further dividing the print production quantity run into smaller production quantities to achieve batch production behavior is also possible and would complement production optimization techniques.

The production manager 66 also understands that items intended to be shipped together should be produced together. Consequently, each print run is broken into multiple runs that represent the quantities required for each shipping destination. In the above example, the production manager would schedule production of 150 Book A covers, 100 Book B covers, 200 Book C covers as a single print run to be shipped to Destination A. The system production manager 66 would also schedule production of 100 sets of Book B inserts to print as another print run. This process is repeated for all desired shipping destinations.

Referring still to FIG. 4, the production manager 66 also retains information about the actual number of covers and inserts printed for each book. This information is used to drive the number of book blocks produced. For example, if the actual number of covers in the printed stacks was 160, 105 and 215 for Book A, B and C respectively, the production manager would adjust the print quantities of the book blocks. Similarly, if books where damaged during production (e.g., because of a jam) the production manager could track the consumption of covers or inserts, and adjust the print quantities of each book block set to reflect the unavailability of additional covers or inserts. It should be appreciated that the production manager 66 is capable of comprehending that a single print run might include multiple jobs concatenated together, so every used sheet, whether it results in a finished book or not, might be irreplaceable for the scope of the job.

To further facilitate document production, the production manager 66 can be provided with the ability to query and retrieve jobs from the assert management system 76. The production manager can also be provided with the ability to adjust print quantities and submit print jobs to automated prepress and printing. Finally, the production manager 66, with its communication lines 80, 82, can track a given job through, among other subsystems, finishing (either inline or offline) or shipping.

The production manager is well suited for use with in-line finishing systems, such as the Book Factory by C. P. Bourg or Digistitch by Ibis. These finishing systems can advantageously handle documents with a variety of dimensions by making finishing-related adjustments on-the-fly. In accordance with the disclosed embodiments, use of the above disclosed approach would, when used with in-line finishers, allow finished jobs to come out of the print engine and inline finisher in the order required for shipping.

Figure 5:
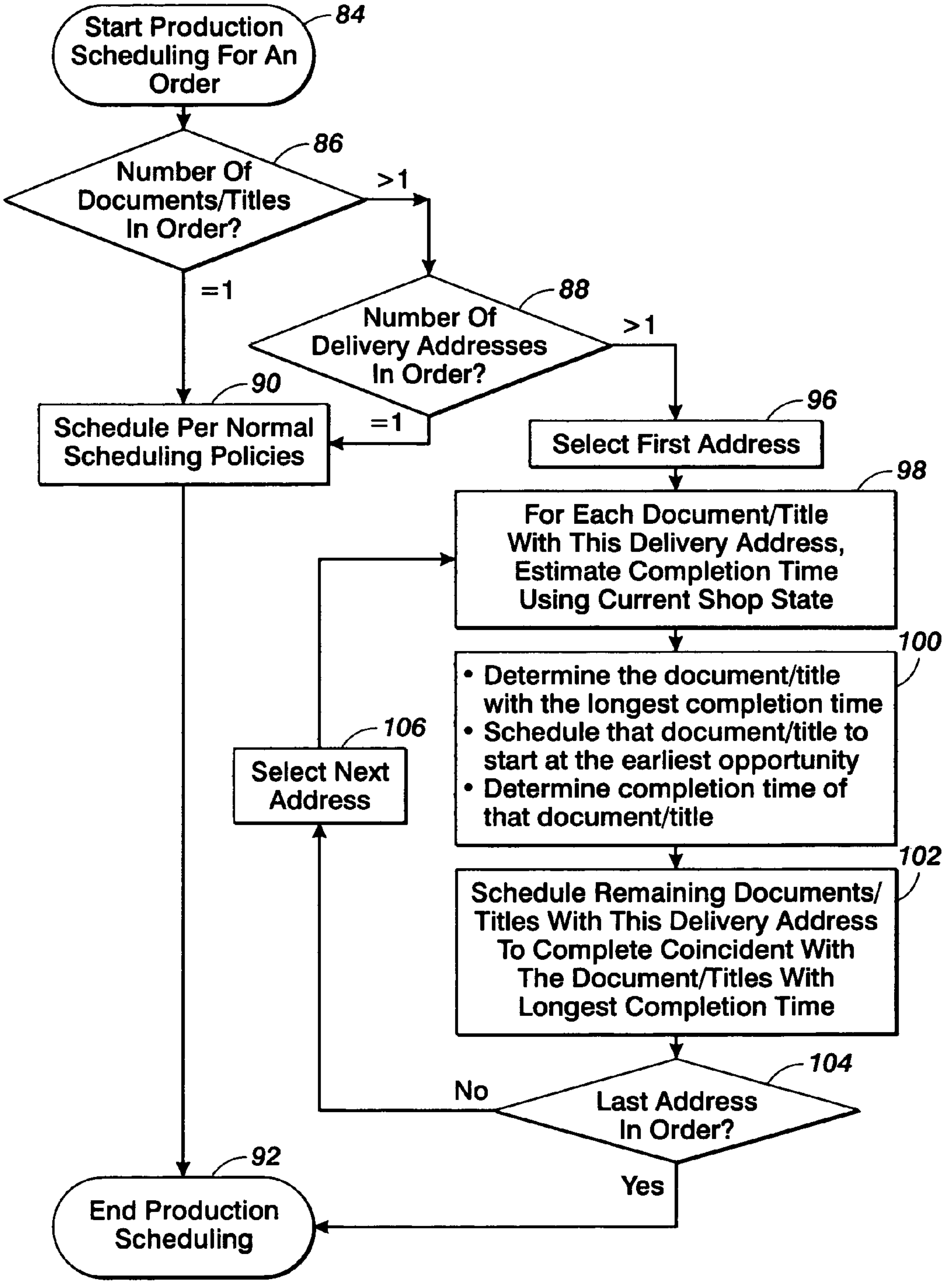
FIG. 5 is an exemplary flow chart for use in scheduling an order.

Referring conjunctively to FIGS. 4 and 5, an exemplary routine for use in scheduling an order with the scheduler 70 is shown. In the routine, production scheduling for an order is taken at step 84, and a query is performed, at step 86, to determine how many documents/titles are present in the order. If it is determined, via query 88, that the number of delivery addresses for the order is equal to one, then the routine proceeds to steps 90, 92 where normal scheduling policies are employed and production scheduling for the order is ended.

If, however, it is determined the number of delivery addresses for the order it greater than one, then, at step 96, the first address of the order is selected. At step 98, the completion time of each document/title associated with the address under consideration is estimated. As noted at step 98, the estimate is based on the current state of the shop 64. Based on the estimate of step 98, the following actions are taken for the order, as a whole, at step 100:

Determine the document/title with the longest completion time.

Schedule the document/title with the longest completion time to start processing at the earliest appropriate opportunity.

Determine completion time of the document/title with the longest completion time.

Referring still to FIG. 5, at step 102, the remaining documents/titles for the address under consideration are scheduled in such a way that processing of all of the documents for the address under consideration are, in one example, completed substantially coincidentally with the document/title having the longest completion time. At step 104, a check is performed to determine if the address under consideration is the last address of the order. If the answer to the check of 104 is negative, then the next address is selected (step 106) and the process continues until the last address of the order is encountered. If the answer to the check of 104 is positive, then production scheduling for the order is ended.

The disclosed embodiments teach the use of an approach in which shipping containers are filled, one at a time, with sets of two or more jobs. This is to be contrasted with at least one known approach in which all sets of a given job are printed and distributed among two or more containers. For larger print runs that must be sent to dozens of destinations, the ability to produce documents by shipping container can greatly reduce labor and logistical problems in shipping and fulfillment.

The disclosed embodiments further comprehend:

Multiple delivery methods, e.g., standard freight and expedited service. Each delivery method or level of service would be scheduled separately.

Ordering the address sequence based upon the date promised to the customer and the expected delivery transit time, e.g., start printing orders with the least slack time where slack time is defined as the unallocated time after accounting for delivery time and production time The following features are also contemplated by the disclosed embodiments:

In a first example, a system is provided in which a document in a first print job suite comprises a first group of one or more print job components and a document in a second print job suite comprises a second group of one or more print job components. The system includes a production manager that schedules processing of the first group of one or more print job components and the second group of one or more print job components for causing processing of the first group of one or more print job components prior to the processing of the second group of one or more print job components.

In a second example, the first print job suite comprises a first print job document and a second print job document. The first and second print job documents correspond respectively with a first print job completion time and a second print job completion time. In practice, a print job processing estimator estimates each of the of the first and second print job completion times.

Pursuant to the second example, it is determined that the first print job completion time is greater than the second print job completion time. In practice, the first and second print job documents are scheduled in such a way as to cause processing of the first print job document to start prior to the processing of the second print job document.

Also pursuant to the second example, the production manager schedules processing of the first and second print job documents in such a way as to cause processing of the first and second print job documents to end substantially coincidentally.

In a third example, the first print job suite comprises a first quantity of print job sets and a second quantity of print job sets. In turn, the print job processing estimator estimates print completion times with the first and second quantities, and the production manager causes scheduling to be performed with the first and second quantities.

Pursuant to the third example, at least partial processing of the first and second quantities of print job sets occurs, and the production manager tracks the at least partial processing to determine an extent to which the first and second quantities of print job sets are obtainable.

Also pursuant to the third example, one of the first and second quantities of print job sets corresponds with a print job component quantity, and the production manager causes the print job component quantity to be adjusted when one or both of the first and second quantities of print job sets are not obtainable.

In a fourth example, a shipment priority is assigned to one or both of the first and second print job suites, and processing of the first print suite is finished before the processing of the second print suite when either (1) the first print job suite is provided with a shipment priority that is at least as great as the second print job suite, or (2) no shipment priority is provided to either the first print job suite or the second print job suite with a shipment priority.

In a fifth example, the first print job suite corresponds with a first print job due time, and the second print job suite corresponds with a second print job due time. In practice, the respective due times of the first and second print job suites may control a processing order of the first and second print job suites.

It will be appreciated that various ones of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A system for scheduling a plurality of first distinct print jobs destined for a first physical shipping destination, the first distinct print jobs being printed at a first physical printing location, the first physical shipping destination being a physical destination to which the finished first distinct print jobs are shipped, the first physical shipping destination being a physical location different from the first physical printing location, and a plurality of second distinct print jobs destined for a second physical shipping destination, the second distinct print jobs being printed at a second physical printing location, the second physical shipping destination being a physical destination to which the finished second distinct print jobs are shipped, the second physical shipping destination being a physical location different from the second physical printing location, comprising:

a print job estimator processor for estimating a time required to complete each first distinct print job destined for the first physical shipping destination, the estimated time including time needed to print a product associated with the first print job and time needed to assemble the printed product; and a production manager processor communicating with said print job estimator processor;

said production manager processor, based upon said time estimated by said print job estimator processor, determining a first distinct print job destined for the first physical shipping destination having a greatest estimated time;

said production manager processor causing processing of the first distinct print job destined for the first physical shipping destination determined to have the greatest estimated time to begin prior to processing of the remaining first distinct print jobs destined for the first physical shipping destination;

said production manager processor causing processing of the remaining first distinct print jobs destined for the first physical shipping destination to be completed coincidentally with completion of the first distinct print job destined for the first physical shipping destination determined to have the greatest estimated time.

2. The system of claim 1, wherein said print job estimator processor estimates a time required to complete each second distinct print job destined for the second physical shipping destination, the estimated time including time needed to print a product associated with the second print job and time needed to assemble the printed product;

said production manager processor, based upon said time estimated by said print job estimator processor, determining a second distinct print job destined for the second physical shipping destination having a greatest estimated time;

said production manager processor causing processing of the second distinct print job destined for the second physical shipping destination determined to have the greatest estimated time to begin prior to processing of the remaining second distinct print jobs destined for the second physical shipping destination;

said production manager processor causing processing of the remaining second distinct print jobs destined for the second physical shipping destination to be completed coincidentally with completion of the second distinct print job destined for the second physical shipping destination determined to have the greatest estimated time.

3. The system of claim 2, wherein said production manager processor causing processing of the second distinct print job destined for the second physical shipping destination determined to have the greatest estimated time to be completed coincidentally with completion of the first distinct print job destined for the first physical shipping destination determined to have the greatest estimated time;

said production manager processor causing processing of the remaining second distinct print jobs destined for the second physical shipping destination to be completed coincidentally with completion of the first distinct print job destined for the first physical shipping destination determined to have the greatest estimated time.

4. The system of claim 2, wherein said production manager processor causing processing of the first distinct print job destined for the first physical shipping destination determined to have the greatest estimated time to be completed coincidentally with completion of the second distinct print job destined for the second physical shipping destination determined to have the greatest estimated time;

said production manager processor causing processing of the remaining first distinct print jobs destined for the first physical shipping destination to be completed coincidentally with completion of the second distinct print job destined for the second physical shipping destination determined to have the greatest estimated time.

* * * * *